United States Patent
Russo et al.

(10) Patent No.: US 6,535,622 B1
(45) Date of Patent: Mar. 18, 2003

(54) METHOD FOR IMAGING FINGERPRINTS AND CONCEALING LATENT FINGERPRINTS

(75) Inventors: Anthony P. Russo, New York, NY (US); Lawrence O'Gorman, Madison, NJ (US)

(73) Assignee: Veridicom, Inc., Sunnyvale, CA (US)

( * ) Notice: Subject to any disclaimer, the term of this patent is extended or adjusted under 35 U.S.C. 154(b) by 0 days.

(21) Appl. No.: 09/300,087

(22) Filed: Apr. 26, 1999

(51) Int. Cl.⁷ .................................................. G06K 9/00
(52) U.S. Cl. ..................................... 382/124; 340/5.83
(58) Field of Search ................. 382/115–119, 124–127; 713/102, 186; 902/3–6; 235/380, 382, 382.5; 340/5.2, 5.21, 5.52, 5.53, 5.8, 5.81, 5.82, 5.83

(56) References Cited

U.S. PATENT DOCUMENTS 4,993,068 A * 2/1991 Piosenka et al. ............ 235/380
6,125,192 A * 9/2000 Bjorn et al. ................ 340/5.83
6,148,094 A * 11/2000 Kinsella ..................... 345/167
6,240,200 B1 * 5/2001 Wendt et al. ................. 359/15

* cited by examiner

Primary Examiner—Joseph Mancuso
Assistant Examiner—Vikkram Bali

(57) ABSTRACT

A method of operating a personal verification system includes acquiring with a sensor a first image of a first biometric feature, removing background noise associated with the sensor from the image, and storing at least a portion of the first image. The method also includes acquiring with the sensor a second image of a second biometric feature and comparing at least a portion of the second image with the first image. If the second image is substantially different from the first image, the second image is displayed.

40 Claims, 3 Drawing Sheets

Microfiche Appendix Included
(1 Microfiche, 13 Pages)

METHOD FOR IMAGING FINGERPRINTS AND CONCEALING LATENT FINGERPRINTS

CROSS-REFERENCE TO MICROFICHE APPENDIX

Appendix A, which is part of the present disclosure, is a microfiche appendix consisting of one (1) sheet of microfiche having 13 frames. Microfiche Appendix A includes a software program, in accordance with the present invention, operable on a host processor.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

This and other embodiments are further described below.

FIELD OF THE INVENTION

The present invention relates to personal verification systems which utilize sensors to obtain biometric information from a user. More particularly, the present invention relates to a method of imaging fingerprints that are difficult to image and of concealing latent prints left behind on the sensor.

BACKGROUND OF THE INVENTION

Personal verification systems utilize a variety of systems and methods to protect information and property and to authenticate authorized users. Some protection systems rely on information acquired by biometric sensors relating to the biometric features of a user's body. The use of biometric information for authentication is advantageous, because each biometric feature is unique to the user. Any biometric feature can be used, including facial features, a retinal image, palm print, fingerprint, or signature. Where the biometric feature is a fingerprint, the biometric sensor obtains information representative of the user's fingerprint.

One disadvantage of biometric sensors is background noise. Background noise caused, for example, by nonuniformity among the transistors of a sensor or environmental conditions, such as dirt, interferes with the signal produced by the sensor, making it difficult to produce a clear image or representation of the biometric feature. Background noise can be problematic for capacitive sensors as well as for sensors which detect speech. For example, for a capacitive sensor that images fingerprints, the background noise generated by the sensor makes it difficult to accurately image very dry fingers. A dry finger placed on the sensor produces a weak signal that can be obscured by the background noise of the sensor. As a result, it may be difficult to determine the unique minutiae from the resulting image or representation of the fingerprint, thereby hampering either the identification or authentication process.

Another problem with biometric sensors, particularly ones in which the user places a body part directly on the sensor, is the remnant of a latent print. For example, natural oil from the user's hand will leave a residue of a fingerprint or palm print on the sensor. Under the right condition, the sensor can be made to read the latent print as if there was an actual finger on the device, and the user could obtain unauthorized access to the protected system.

There is a need, therefore, for a method of eliminating background noise so as to improve the image or representation produced by a biometric sensor. In addition, because the method of eliminating background noise can also make latent prints much more visible, there is also a need for a method of preventing latent prints from being used to gain access to a protected system.

SUMMARY

In accordance with an embodiment of the invention, a method is provided for operating a personal verification system. The method includes acquiring with a sensor a first image of a first biometric feature and storing at least a portion of the first image. The method further includes acquiring with the sensor a second image of a second biometric feature, comparing at least a portion of the second image to the first image, and displaying the second image if the second image is substantially different from the first image. The portion of the second image that is compared to the first image is the same portion as the stored portion of the first image.

In accordance with another embodiment of the invention, a method of operating a personal verification system includes measuring or estimating a background noise from a biometric sensor and acquiring a first image of a first biometric feature positioned on the sensor. The background noise is then removed from the first image to obtain a noise-reduced image. The method further includes applying a gain to the noise-reduced image to enhance it further.

In accordance with still another embodiment of the invention, a method is provided for operating a personal verification system. The method includes generating a first image of a first biometric feature positioned on a sensor and storing at least a portion of the first image before or when the first biometric feature is removed from the sensor. The method also includes generating a second image of a second biometric feature positioned on the sensor and comparing at least a portion of the second image to the first image. Both the first and second images can be noise-reduced images. The method further includes displaying the second image only if the second image is substantially different from the first image.

Thus, the present invention provides a couple of benefits and advantages. The present invention provides an improved image of a biometric feature, by eliminating or reducing background noise, thereby making it possible to image dry fingers. In addition, the present invention conceals latent prints to prevent unauthorized persons from accessing the system. By comparing a newly acquired image of a biometric feature with the most recent prior image and displaying the newly acquired image only if the two are different, the system ensures that the user is not using a latent print to access the system.

BRIEF DESCRIPTION OF THE DRAWINGS

The present invention may be better understood, and its numerous features and advantages made apparent to those skilled in the art by referencing the accompanying drawings.

DETAILED DESCRIPTION

Figure 1:
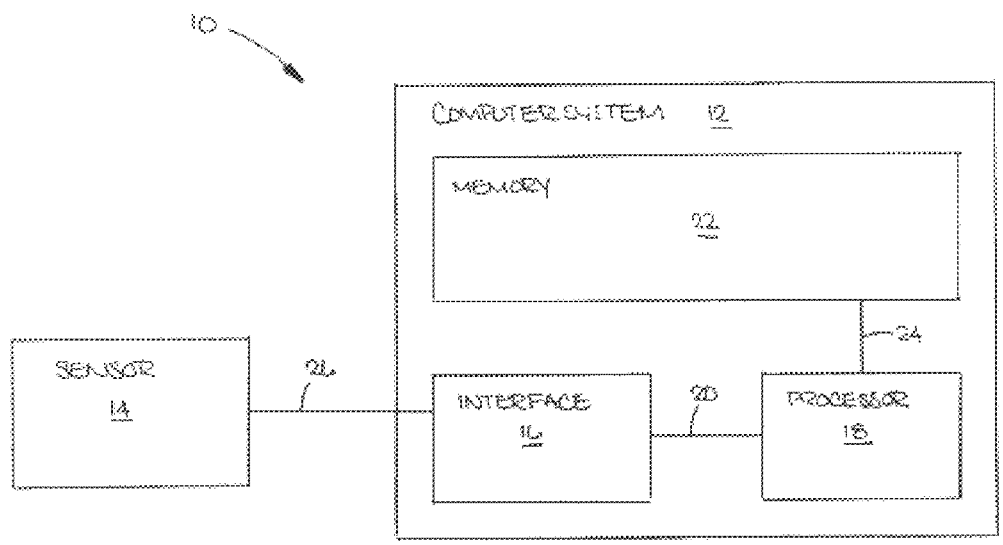
FIG. 1 is a schematic diagram of one embodiment of a personal verification system in accordance with the invention.

FIG. 1 illustrates a personal verification system 10 in accordance with an embodiment of the present invention. Personal verification system 10 includes a computer system 12 and a biometric sensor 14. Computer system 12 includes an interface 16, a processor 18 connected to interface 16 by an interface-processor bus 20, and a memory 22 connected to processor 18 by a bus 24.

Computer system 12 generically represents any type of computer system, such as a microprocessor-based system, a mainframe system, or any other type of general or special purpose computing system which includes an interface, a processor and memory. Processor 18 is any type of processor, such as a microprocessor, dedicated logic, a digital signal processor, a programmable gate array, a neural network, or a central processor unit implemented in any other technology. Although FIG. 1 illustrates processor 18 and sensor 14 as separate and distinct components, one skilled in the art will appreciate that processor 18 can be integrated with sensor 14.

Biometric sensor 14 is coupled to computer system 12 via an input-output line 26. Alternatively, biometric sensor 14 can be integrated in computer system 12. Biometric sensor 14 produces a representation of a biometric feature, such as a fingerprint, palm print, retinal image, facial feature, signature or any other biometric attribute or characteristic. Although only one biometric sensor is shown in FIG. 1, any number of such sensors can be connected to computer 12 in any combination, enabling various biometric features from one or more users to be used. In the preferred embodiment of the invention, biometric sensor 14 is a capacitive fingerprint sensor. However, biometric sensor 14 can be any type of sensor used to detect a biometric feature including, a camera, a laser-based sensor, or a pressure sensor. Examples of biometric sensors are described in U.S. patent application Ser. No. 08/573,100, entitled "Capacitive Fingerprint Acquisition Sensor," filed Dec. 15, 1995, U.S. patent application Ser. No. 08/855,230, entitled "Capacitive Fingerprint Sensor with Adjustable Gain," filed May 13, 1997, and U.S. patent application Ser. No. 08/971,455, entitled "Automatic Adjustment Processing for Sensor Devices," filed Nov. 17, 1997. All three applications are commonly owned with the present application and are herein incorporated by reference.

Biometric sensor 14 generates an image or representation of a biometric feature. Signals representing the detected image are then sent by way of input-output line 26 into computer system 12 where the image is then stored in memory 22. In the preferred embodiment, biometric sensor 14 generates an image of a user's fingerprint. Once the user's fingerprint has been enrolled and registered in the system, personal verification device 10 can later identify or authenticate the user. To authenticate the user at a later time, the user provides the appropriate finger to biometric sensor 14, which then generates an image of the fingerprint and inputs the image to processor 18. Processor 18 compares the acquired fingerprint image with those stored in memory 22 to identify the user or to authenticate that the user is authorized to use personal verification system 10. Details as to the implementation of personal verification system 10 are described in U.S. patent application Ser. No. 08/857,642, entitled "Identification and Security Using Biometric Measurements," filed May 15, 1997 and U.S. patent application Ser. No. 09/040,649, entitled "Integrated Biometric Authentication for Access to Computers," filed Mar. 17, 1998, both of which are herein incorporated by reference.

Figure 2:
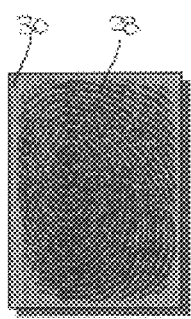
FIG. 2 is a raw image of a fingerprint.
Figure 3:
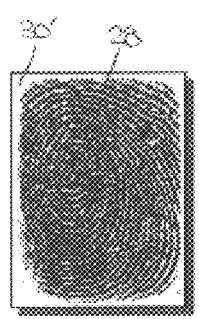
FIG. 3 is a noise-reduced image of the fingerprint of FIG. 2.

As discussed earlier, one problem with biometric sensors is background noise. Background noise, which can be problematic for capacitive sensors, obscures the image of the biometric feature acquired with biometric sensor 14. By way of example, FIG. 2 is an image of a fingerprint 28 acquired with biometric sensor 14. The image has a background 30 which is gray, representing the background noise produced by sensor 14. The gray background makes it difficult to determine the minutiae of fingerprint 28. FIG. 3, on the other hand, is the same image of fingerprint 28 as shown in FIG. 2 but with the background noise eliminated or reduced. The image in FIG. 3 has a much lighter background 30', thereby providing a sharper contrast with fingerprint 28 and making the minutiae of fingerprint 28 more apparent.

Figure 4:
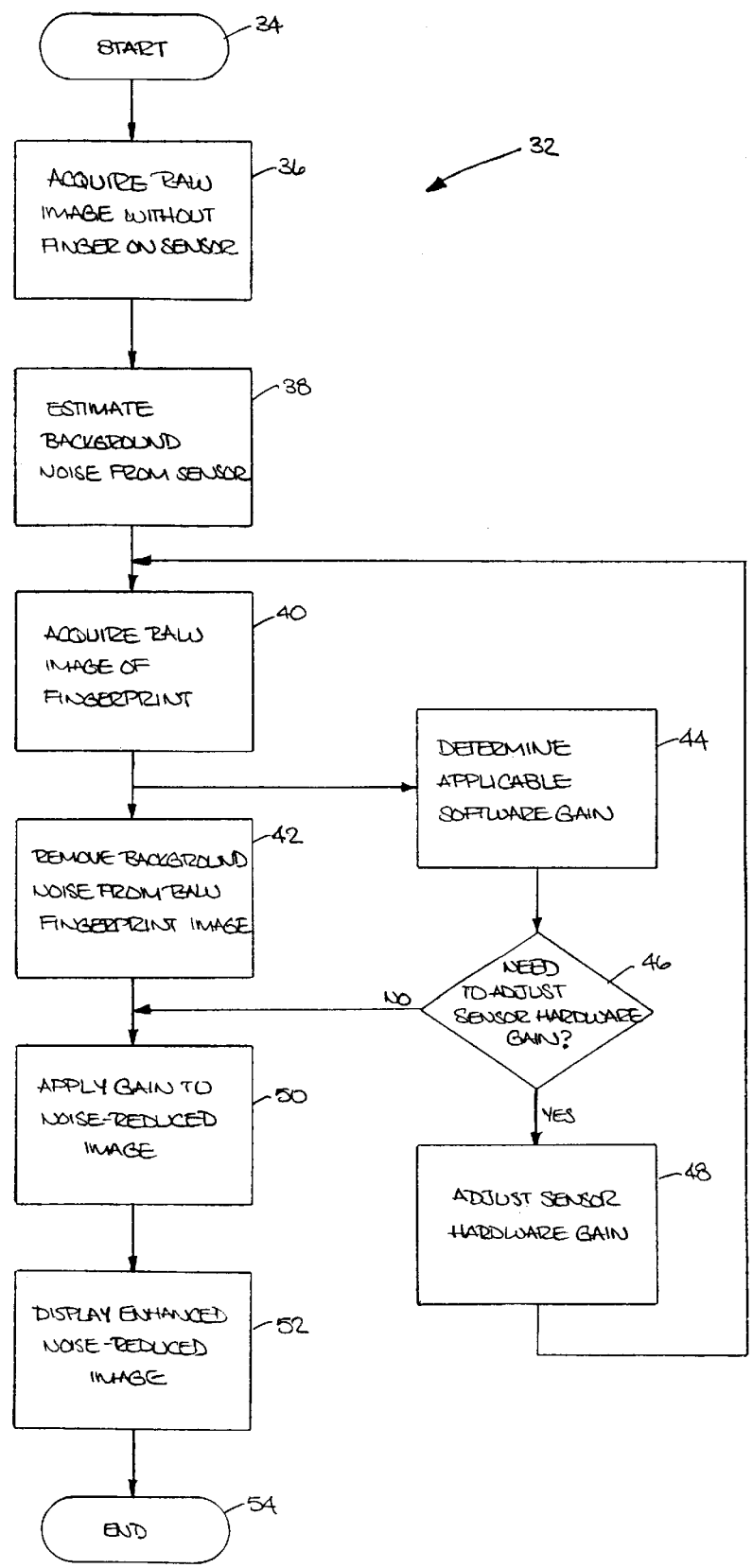
FIG. 4 is a flow chart depicting a process of enhancing the image of a fingerprint in accordance with the present invention.

FIG. 4 is a flow chart 32 indicating the sequence of operations involved in eliminating or reducing background noise. Noise-reduction flow chart 32 begins at step 34, which is the start state, and proceeds to step 36. At step 36, biometric sensor 14 acquires an image without any biometric feature positioned on sensor 14. Step 36 preferably is a one-time acquisition by sensor 14 of the image without a biometric feature present. However, because background noise can vary over time, for example, dirt buildup on the sensor, step 36 can also be executed multiple times either on command or automatically to update the image. Signals representing the captured image are then delivered to computer system 12.

At step 38, processor 18 estimates the background noise of sensor 14. In the preferred embodiment of the invention, processor 18 obtains the actual background noise data for every pixel of the image. Processor 18, however, can also estimate the background noise over only a portion of the image. For example, processor 18 may calculate an average background noise per pixel based upon a few rows of the image or any other portion of the image, including a central or peripheral portion of the image. The estimated background noise for the image is then stored in memory 22 of computer system 12.

At step 40, biometric sensor 14 acquires an image of a finger positioned on sensor 14. The acquired image, similar to that shown in FIG. 2, is a raw image of the user's fingerprint and includes the background noise of sensor 14. Biometric sensor 14 transfers signals representing this raw fingerprint image to processor 18, where the raw fingerprint image will be enhanced.

At step 42, processor 18 removes from the raw fingerprint image the background noise of sensor 14. Processor 18 can use at least two methods to eliminate or reduce the background noise. One method involves subtracting for each pixel of the image the background noise from the raw fingerprint image. The result is the difference between the raw fingerprint image and the background noise, or:

$$I_{(x,y)} = R_{(x,y)} - N_{(x,y)}.$$

where for each pixel (x,y), R is the raw fingerprint image, N is the background noise, and I is the resulting noise-reduced image. Depending on how the background noise was calculated at step 38, the background noise for the particular pixel can be either the actual background noise for that pixel or an average background noise calculated for a portion of the image.

A second method includes dividing the difference produced by the first method for each pixel by the background noise for that pixel, or:

$$I_{(x,y)}=(R_{(x,y)}-N_{(x,y)})/N_{(x,y)}.$$

The preferred embodiment of the invention employs this second method, which produces a signal-to-noise ratio, because it provides better results in a high background noise environment by making the signal vary less as a result of the noise level. The resulting image at step 42 is a noise-reduced fingerprint image.

At step 44, processor 18 determines an applicable software gain to apply to the fingerprint image. The gain is selected by determining overall lightness or darkness for the raw image and selecting the gain accordingly. For a light image, the gain is increased in order to darken the image, whereas the gain is reduced to lighten an already dark image. For example, for a very light image, the gain can be increased to 2000, and for a very dark image, the gain can be reduced to 255. In the preferred embodiment of the invention, three centrally located rows of the raw fingerprint image are used to determine the applicable gain. For each of the three centrally located columns, processor 18 calculates an average signal. Processor 18 then selects the median of the three averages and uses this as the average signal for the entire image. For example, if three centrally located columns of an image have averages of 55, 40 and 50, respectively, processor 18 would use 50 as the average signal for the entire image. Based on predetermined formulas or conventional look-up tables, processor 18 selects the appropriate gain. The present invention uses the following formula to determine the appropriate gain:

if medianAvg<8 then gain (200)*67 if 8<=medianAvg<40 then gain=((40−medianAvg)*75+530)*67 if 41<medianAvg<=70 then gain=(70−medianAvg)*8+250)*67 if medianAvg>70 then gain=(105−medianAvg)*3+200)*67

If the resulting gain is greater than 2000, processor 18 sets the gain to 2000. Similarly, if the resulting gain is less than 255, processor 18 sets the gain to 255. While the preferred embodiment of the invention uses the raw fingerprint image from step 40 to determine the applicable gain, one skilled in the art will appreciate that processor 18 could perform step 44 using the noise-reduced image generated at step 42.

At step 46, processor 18 determines whether the software gain from step 44 is sufficient. In some cases, where the required software gain is too low, the sensor—if it also has gain settings—can be adjusted to have different gain. If there is no need to adjust the sensor hardware gain, the system proceeds to step 50 which will be described below.

On the other hand, processor 18 determines that there is a need to adjust the sensor hardware gain, the system proceeds to step 48 where it adjusts the sensor hardware gain. The system then returns to step 40 where sensor 14 acquires another raw image of the fingerprint. Further information on adjusting the sensor hardware gain is described in U.S. patent application Ser. No. 08/971,455, entitled "Automatic Adjustment Processing for Sensor Devices," filed Dec. 17, 1997 and herein incorporated by reference.

At step 50, processor 18 applies the software gain, which it selected at step 44, to the noise-reduced image of step 42 to produce an enhanced fingerprint image, similar to that shown in FIG. 3. At step 52, computer system 12 displays the enhanced, noise-reduced image. The system then proceeds to step 54 and ends, and the user can remove his finger from sensor 14.

Figure 5:
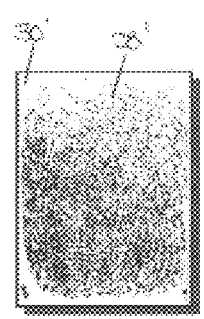
FIG. 5 is an image of a latent fingerprint produced by the finger whose print is illustrated in FIGS. 2 and 3.

When the user removes his finger from sensor 14, natural oils from the user's hand remain on sensor 14, leaving a trace of the user's fingerprint. FIG. 5 is an image of a latent fingerprint 28' left on sensor 14 by the finger which produced fingerprint 28 in FIGS. 2 and 3. Latent fingerprint 28' is easily made visible by blowing hot air on sensor 14. In addition, because latent fingerprints can resemble very dry fingers, the steps of noise reduction flow chart 32 can be used to image latent prints. Imaging of latent prints is undesirable because a random person could use a latent print to obtain unauthorized access to system 10. In order to prevent such unauthorized access, personal verification system 10 must be able to conceal or suppress latent prints.

Figure 6:
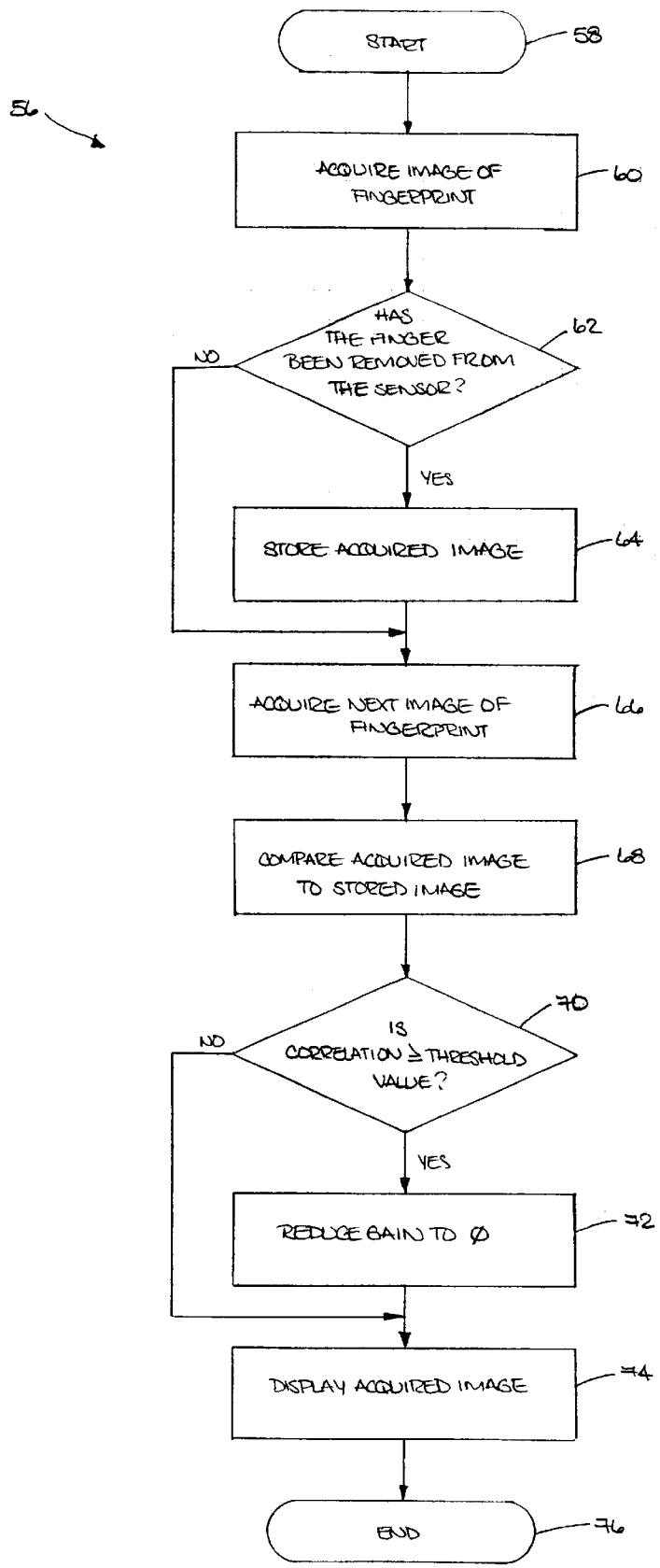
FIG. 6 is a flow chart depicting a process of suppressing a latent fingerprint in accordance with the present invention.

FIG. 6 is a flow chart 56 indicating the sequence of operations involved in suppressing a latent fingerprint. Latent print suppression flow chart 56 begins at step 58, which is the start state, and proceeds to step 60. At step 60, the user places a finger on biometric sensor 14, and sensor 14 acquires an image of the user's fingerprint. The image acquired at this step can be a raw fingerprint image such as that obtained at step 40 in FIG. 4, a noise-reduced image obtained at step 42 in FIG. 4, or an enhanced noise-reduced image obtained at step 52 of FIG. 4.

At step 62, processor 18 determines whether the user has removed his finger from biometric sensor 14. Biometric sensor 14 generates a strong capacitance signal when a finger is in contact with sensor 14. This signal drops significantly when the finger is removed from biometric sensor 14 and sharply increases when the same finger or a different finger is placed on sensor 14. By monitoring the capacitance from biometric sensor 14, processor 18 can determine whether a finger has been removed from sensor 14.

If at step 62 processor 18 determines that the user's finger still remains in contact with biometric sensor 14, the system proceeds to step 66. At step 66, biometric sensor 14 acquires another image of the user's fingerprint.

On the other hand, if at step 62 processor 18 determines that the user's finger is no longer in contact with biometric sensor 14, the system proceeds to step 64. At step 64, computer system 10 stores the acquired fingerprint image in memory 22. Memory 22 can include volatile memory, non-volatile memory, or even a file. The entire fingerprint image or only a portion thereof can be stored in memory 22. If only a portion of the image is stored, it is preferable to store a centrally located portion of the image. Once the image has been stored, the system then proceeds to step 66, where biometric sensor 14 acquires another fingerprint image. The image acquired at step 66 can be that of the same finger, lifted off of biometric sensor 14 and then replaced, or that of a different finger.

At step 68, processor 18 compares the image acquired at step 66 to the stored image from step 64. Processor 18 can compare both images in their entirety or, alternatively, only a portion of each image. An example of the latter situation includes comparing the same central portion of both images. In comparing the two images, processor 18 determines at step 70 whether the correlation between the two images is greater than a threshold value. The present invention uses a conventional linear correlation method, however, other correlation methods can also be used. The threshold value is preferably a correlation coefficient of approximately 0.7. For values greater than or equal to 0.7 the image acquired at step 66 is substantially identical to the stored image in terms of its minutiae, position and orientation, indicating that the acquired image is likely to be a latent print. It should be noted that a finger lifted off of biometric sensor 14 and then replaced generally will not produce a fingerprint image identical to a previously acquired image, because it is unlikely that the user will place his finger on sensor 14 in the same position and orientation as before.

If at step 70 the correlation between the acquired and stored images is less than the threshold value, the acquired image is substantially different from the stored image and is not a latent print. The system proceeds to step 74, at which point computer system 12 displays the acquired fingerprint image.

If, on the other hand, at step 70 the correlation between the acquired and stored images is greater than or equal to the threshold value, the acquired image is likely to be that of a latent print of the stored image and should not be displayed or used for further processing. The system then proceeds to step 72. At step 72, processor 18 applies a substantially reduced gain to the acquired fingerprint image. Preferably, the gain is reduced to zero; however, any small gain approaching zero can also be used. The reduced gain lightens the image, thereby suppressing or concealing the latent fingerprint.

Figure 7:
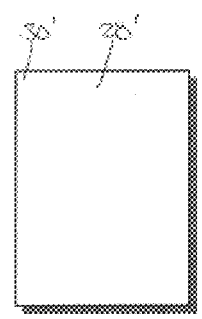
FIG. 7 is an image of the latent fingerprint of FIG. 5 with the image suppressed.

At step 74, computer system 12 displays the acquired fingerprint image. As discussed above, where there is little correlation between the two images, the acquired fingerprint image will be displayed to the user. However, if the correlation between the two images is high, computer system 12 will display the suppressed fingerprint image. FIG. 7 is an image of latent fingerprint 28' of FIG. 6 after it has been suppressed in accordance with the present invention. Here, the gain has been reduced almost to zero and fingerprint 28' is barely visible, making it very difficult for a person to use the latent print to gain access to the system. Alternatively, rather than display the suppressed latent fingerprint, computer system 12 can display a blank or other default image or an error signal. Finally, the system proceeds to step 76 and ends.

While the present invention has been described with reference to specific embodiments, the description is illustrative of the invention and is not to be construed as limiting the invention. For example, although the present invention is shown with respect to a capacitive fingerprint sensor, other biometric sensors for other biometric features may also be used. Various modifications may occur to those skilled in the art without departing from the true spirit and scope of the invention as defined by the appended claims.

What is claimed is:

1. A method of operating a personal verification system comprising:
   determining whether a first biometric feature is present on a sensor;
   acquiring, with the sensor, a first image of said first biometric feature when the first biometric feature is present;
   storing at least a portion of the first image when the first biometric feature is removed from the sensor;
   acquiring, with the sensor, a second image of a second biometric feature;
   comparing at least a portion of the second image to the first image; and
   displaying the second image if the second image is substantially different from the first image.

2. The method of claim 1, wherein a centrally located portion of the first image is stored and compared to a centrally located portion of the second image.

3. The method of claim 1, wherein the first image is stored in a volatile memory.

4. The method of claim 1, wherein the first image is stored in a non-volatile memory.

5. The method of claim 1, wherein the first image is stored in a file.

6. The method of claim 1, wherein the first and second biometric features are fingerprints.

7. The method of claim 1, wherein the sensor is a capacitive sensor.

8. The method of claim 1, wherein the sensor is an optical sensor.

9. The method of claim 1, wherein the first and second images are noise-reduced images.

10. The method of claim 9, further comprising:
    estimating a background noise from the sensor; and
    removing the background noise from the first and second images to obtain respective noise-reduced first and second images.

11. The method of claim 10, wherein estimating the background noise includes acquiring an image without a biometric feature positioned on the sensor.

12. The method of claim 11, wherein removing the background noise includes:
    determining an amount of background noise for each pixel of the image acquired without a biometric feature positioned on the sensor;
    for each of the first and second images, calculating for each pixel of the image a difference between the respective acquired image and the respective amount of background noise; and
    for each of the first and second images, dividing the difference for each pixel by the respective amount of background noise.

13. The method of claim 11, wherein removing the background noise includes:
    averaging an amount of background noise over a portion of the image;
    for each of the first and second images, calculating for each pixel of the image a difference between the respective acquired image and the average amount of background noise over the portion of the image; and
    for each of the first and second images, dividing the difference for each pixel by the average amount of background noise over the portion of the image.

14. The method of claim 10, further comprising applying a gain to the noise-reduced first and second images to enhance the images.

15. The method of claim 1, wherein comparing at least a portion of the second image to the first image includes calculating a correlation coefficient.

16. The method of claim 15, wherein the second image is displayed if the correlation coefficient is less than approximately 0.7.

17. The method of claim 15, further comprising:
    applying a substantially reduced gain to the second image if the correlation coefficient is greater than approximately 0.7; and
    displaying the gain-altered second image.

18. The method of claim 17, wherein the substantially reduced gain is approximately zero.

19. A method of operating a personal verification system comprising:
    estimating a background noise from a biometric sensor, by acquiring an image without a biometric feature positioned on the sensor, and averaging an amount of background noise over a portion of the image;

acquiring a first image of a first biometric feature positioned on the sensor;

removing the background noise from the first image to obtain a noise-reduced image by calculating for each pixel of the image a difference between the acquired first image and the average amount of background noise over the portion of the image, and dividing the difference for each pixel by the average amount of background noise over the portion of the image; and applying a gain to the noise-reduced image to enhance the first image.

20. The method of claim 19, wherein the first biometric feature is a fingerprint.

21. The method of claim 19, wherein the sensor is a capacitive sensor.

22. The method of claim 19, wherein the sensor is an optical sensor.

23. The method of claim 19, wherein estimating the background noise includes:

acquiring an image without a biometric feature positioned on the sensor; and determining an amount of background noise for each pixel of the image.

24. The method of claim 23, wherein removing the background noise includes:

calculating for each pixel of the image a difference between the acquired first image and the respective amount of background noise; and dividing the difference for each pixel by the respective amount of background noise.

25. The method of claim 19, further comprising:

calculating an average signal for the noise-reduced image; and selecting the gain based upon the average signal.

26. The method of claim 25, wherein the average signal for the noise-reduced image is a median value of a plurality of averages for a respective plurality of centrally located rows of the noise-reduced image.

27. The method of claim 19, further comprising:

storing at least a portion of the noise-reduced first image;

acquiring a second image of a second biometric feature positioned on the sensor;

comparing at least a portion of the second image to the first image; and displaying the second image if the second image is substantially different from the first image.

28. The method of claim 27, wherein storing at least a portion of the noise-reduced first image occurs when the first biometric feature is removed from the sensor.

29. The method of claim 27, wherein comparing at least a portion of the second image to the first image includes calculating a correlation coefficient.

30. The method of claim 29, wherein the second image is displayed if the correlation coefficient is less than approximately 0.7.

31. The method of claim 29, further comprising:

applying a substantially reduced gain to the second image if the correlation coefficient is greater than approximately 0.7; and displaying the gain-altered second image.

32. The method of claim 31, wherein the substantially reduced gain is approximately zero.

33. A personal verification system comprising:

a biometric sensor;

a computer implemented means operable with the sensor for determining whether a first biometric feature is present on the sensor;

a computer implemented means operable with the sensor for acquiring a first image of said first biometric feature when the first biometric feature is present;

a computer implemented means for storing at least a portion of the first image when the first biometric feature is removed from the sensor;

a computer implemented means operable with the sensor for acquiring a second image of a second biometric feature;

a computer implemented means for comparing at least a portion of the second image to the first image; and a computer implemented means for displaying the second image if the second image is substantially different from the first image.

34. The system of claim 33, wherein a centrally located portion of the first image is stored and compared to a centrally located portion of the second image.

35. The system of claim 33, wherein the first image is stored in a volatile memory.

36. The system of claim 33, wherein the first image is stored in a non-volatile memory.

37. The system of claim 33, wherein the first image is stored in a file.

38. The system of claim 33, wherein the first and second biometric features are fingerprints.

39. The system of claim 33, wherein the sensor is a capacitive sensor.

40. The system of claim 33, wherein the sensor is an optical sensor.

* * * * *